(12) United States Patent
Fujisawa

(10) Patent No.: US 11,769,160 B2
(45) Date of Patent: Sep. 26, 2023

(54) CONSUMER GOODS PROCUREMENT ASSISTING SYSTEM

(71) Applicant: Kazunori Fujisawa, Tokyo (JP)

(72) Inventor: Kazunori Fujisawa, Tokyo (JP)

( * ) Notice: Subject to any disclaimer, the term of this patent is extended or adjusted under 35 U.S.C. 154(b) by 0 days.

(21) Appl. No.: 17/042,307

(22) PCT Filed: Mar. 28, 2019

(86) PCT No.: PCT/JP2019/013514
§ 371 (c)(1),
(2) Date: Sep. 28, 2020

(87) PCT Pub. No.: WO2019/194060
PCT Pub. Date: Oct. 10, 2019

(65) Prior Publication Data
US 2021/0019695 A1    Jan. 21, 2021

(30) Foreign Application Priority Data
Apr. 5, 2018  (JP) .................................. 2018-073066

(51) Int. Cl.
*G06Q 30/0201* (2023.01)
*G06Q 10/087* (2023.01)
*G06Q 30/0601* (2023.01)

(52) U.S. Cl.
CPC ....... *G06Q 30/0201* (2013.01); *G06Q 10/087* (2013.01); *G06Q 30/0641* (2013.01)

(58) Field of Classification Search
CPC ........... G06Q 30/0641; G06Q 30/0201; G06Q 10/087; G06F 21/31
See application file for complete search history.

(56) References Cited

U.S. PATENT DOCUMENTS 8,583,512 B1 *  11/2013  Gupta ................... G06Q 30/06
                                                       705/26.1
9,904,946 B2 *  2/2018  Ellison ............... G06Q 30/0613
(Continued)

FOREIGN PATENT DOCUMENTS

JP    2003-30421 A   1/2003
JP    2015-162164 A  9/2015
(Continued)

OTHER PUBLICATIONS

Cardis, "System and Method for Programmatic Identification and Cross-Platform Registration of Hardware Products via Visual Object Recognition," U.S. Appl. No. 62/551,853, filed Aug. 30, 2017. pp. 24 (Year: 2017).*

(Continued)

*Primary Examiner* — Asfand M Sheikh
(74) *Attorney, Agent, or Firm* — Muncy, Geissler, Olds & Lowe, P.C.

(57) ABSTRACT

A consumer item procurement support system capable of performing a more appropriate commodity proposal and the like is provided. The consumer item procurement support system includes an information processing server that communicates with a terminal of a customer, and manages a taken image of a commodity (consumer item) captured by the terminal of the customer, wherein the information processing server: executes a recognition process of the commodity (consumer item), based on the taken image of the commodity (consumer item) captured by the terminal of the customer; displays, on the terminal of the customer, one or more commodity candidates extracted as a result of execution of the recognition process; and determines an unpurchased commodity, by allowing the customer to select an actually purchased commodity from among the commodity candidates.

6 Claims, 14 Drawing Sheets

(56) References Cited

U.S. PATENT DOCUMENTS

| | | | | |
|---|---|---|---|---|
| 10,621,441 B2* | 4/2020 | Hiramatsu | | G07G 1/0081 |
| 2009/0319388 A1* | 12/2009 | Yuan | | G06Q 30/0601 |
| | | | | 707/999.005 |
| 2012/0265694 A1* | 10/2012 | Tuchman | | G06Q 10/02 |
| | | | | 705/304 |
| 2014/0089133 A1* | 3/2014 | Argue | | G06Q 30/0282 |
| | | | | 705/26.7 |
| 2014/0156461 A1* | 6/2014 | Lerner | | G06Q 30/0635 |
| | | | | 705/26.61 |
| 2014/0236622 A1* | 8/2014 | Southam | | G06Q 10/04 |
| | | | | 705/2 |
| 2014/0303991 A1* | 10/2014 | Frank | | G06Q 30/0201 |
| | | | | 705/26.1 |
| 2015/0149298 A1* | 5/2015 | Tapley | | G06Q 30/0269 |
| | | | | 705/14.66 |
| 2017/0039613 A1* | 2/2017 | Kaehler | | G02B 27/0172 |
| 2017/0053312 A1 | 2/2017 | Tsunoda | | |
| 2017/0132681 A1* | 5/2017 | Modi | | G06Q 30/0631 |
| 2018/0239319 A1* | 8/2018 | Abdoo | | G05B 15/02 |
| 2018/0268471 A1* | 9/2018 | Slusarczyk | | G06Q 30/0639 |
| 2019/0065851 A1* | 2/2019 | Cardis | | G06K 9/00664 |
| 2019/0205965 A1* | 7/2019 | Li | | G06Q 30/0643 |
| 2020/0167855 A1* | 5/2020 | Nakamura | | G06Q 30/0631 |

FOREIGN PATENT DOCUMENTS

| | | | | |
|---|---|---|---|---|
| JP | 2016-038796 A | | 3/2016 | |
| JP | 2017-117114 A | | 6/2017 | |
| WO | WO-2013126648 A1 | * | 8/2013 | G06Q 30/02 |
| WO | 2015/182200 A1 | | 12/2015 | |
| WO | 2015186393 A1 | | 12/2015 | |

OTHER PUBLICATIONS

Liu, Guimei, et al. "Repeat buyer prediction for e-commerce." Proceedings of the 22nd ACM SIGKDD International Conference on Knowledge Discovery and Data Mining. 2016. (Year: 2016).*

* cited by examiner

CONSUMER GOODS PROCUREMENT ASSISTING SYSTEM

TECHNICAL FIELD

The present invention widely relates to a system and the like that support daily life in general households and the like, and more specifically, relates to a consumer item procurement support system and the like that support purchase and procurement of consumer items, such as articles for daily use and home electric appliances.

BACKGROUND ART

Conventionally, techniques for supporting daily life in general households and the like and daily behavior of users by providing commodities and commodity information, have been provided.

For example, a living support system has been proposed that includes a sensor that observes storage and retrieval of food to be preserved in a refrigerator and a state of freshness maintenance of the food, proposes an optimum management model from the observation results, for example, a menu and a food purchase plan, and forms means for ordering food and the like, for the sake of analyzing the living conditions and a decision-making process and reducing familiar housework (Patent Literature 1).

That is, Patent Literature 1 discloses a living support system that includes observation means for observing various phenomena as required and outputting an objective indicator, and prediction means for analyzing the indicator and issuing a prediction related to the various phenomena, and supports family life and/or socioeconomy through the prediction or the indicator, the system further including: consumer item demand prediction means for predicting demand for consumer items on the basis of the family configuration; means for procuring the consumer items so as to support the demand for the consumer items; observation means for observing individual items of the consumer items that are stored in storage means and are to be provided for family life, retrieval and storage quantities, stock period and quality condition on an item-by-item basis; and a program for controlling the means for procuring the consumer items so as to compare the observed result with the demand and eliminate the deviation therebetween.

A system that prevents occurrence of forgetting purchase of commodities has also been proposed (Patent Literature 2).

That is, Patent Literature 2 discloses a purchase item management system where an image formation apparatus installed in a store, and an information processing apparatus are connected to each other in a communicable manner. The information processing apparatus stores purchase histories of users in the store and identification information on the users in association with each other on a user-by-user basis. The information processing apparatus accepts an input of the identification information. Upon input of the identification information into the image forming apparatus, the information processing apparatus or the image forming apparatus extracts, as a target history, the purchase history corresponding to the identification information input into the image forming apparatus, and predicts a commodity satisfying a predetermined condition among items indicated by the target history, as an item to be purchased by the user. The information processing apparatus prints notification information for issuing notification about the item to be purchased.

Furthermore, an information processing apparatus and the like that predict a user's behavior and provide an item have been proposed (Patent Literature 3).

That is, Patent Literature 3 discloses an information processing apparatus that includes: an acquisition unit that acquires sensing data obtained by detecting a behavior of a user; a recognition unit that recognizes a situation of the user on the basis of the acquired sensing data; an behavior prediction unit that predicts a behavior of the user on the basis of the recognized situation of the user; and a presentation unit that presents information for providing an item (commodity) for the user on the basis of the predicted behavior of the user.

CITATION LIST

Patent Literature

Patent Literature 1: Japanese Patent Laid-Open No. 2003-30421
Patent Literature 2: Japanese Patent Laid-Open No. 2017-117114
Patent Literature 3: International Publication No. WO 2015/182200

SUMMARY OF INVENTION

Technical Problem

However, in conventional arts disclosed in Patent Literatures 1 to 3, various methods have been adopted where in order to make an optimal commodity proposal to the customer or the user, "commodity assumed to be purchased next" by the customer or the user is predicted and estimated on the basis of the behavior experience and behavior history, such as purchase, browse, and search, by the customer or the user.

That is, for example, commodities purchased by the customer or the user not from the company concerned but from other companies, and services received from the other companies cannot be grasped. Accordingly, there are situations in which a commodity proposal truly useful for the customer or the user is difficult to be achieved.

Consequently, it is expected to achieve optimal commodity proposals or service proposals including "unpurchased commodity information" and "unprovided services" from the own company that have been difficult to be collected.

Solution to Problem

A consumer item procurement support system according to one embodiment of the present invention is a consumer item procurement support system including an information processing server that communicates with a terminal of a customer, and manages a taken image of a commodity (consumer item) captured by the terminal of the customer, wherein the information processing server: executes a recognition process of the commodity (consumer item), based on the taken image of the commodity (consumer item) captured by the terminal of the customer; displays, on the terminal of the customer, one or more commodity candidates extracted as a result of execution of the recognition process; and determines an unpurchased commodity, by allowing the customer to select an actually purchased commodity from among the commodity candidates.

Advantageous Effects of Invention

According to one embodiment of the present invention, a system and the like can be provided that can improve not only daily life of a customer and a user but also behavioral usability; the improvement encompasses a more appropriate commodity proposal or service proposal based on information having not been grasped.

DESCRIPTION OF EMBODIMENTS

Figure 1:
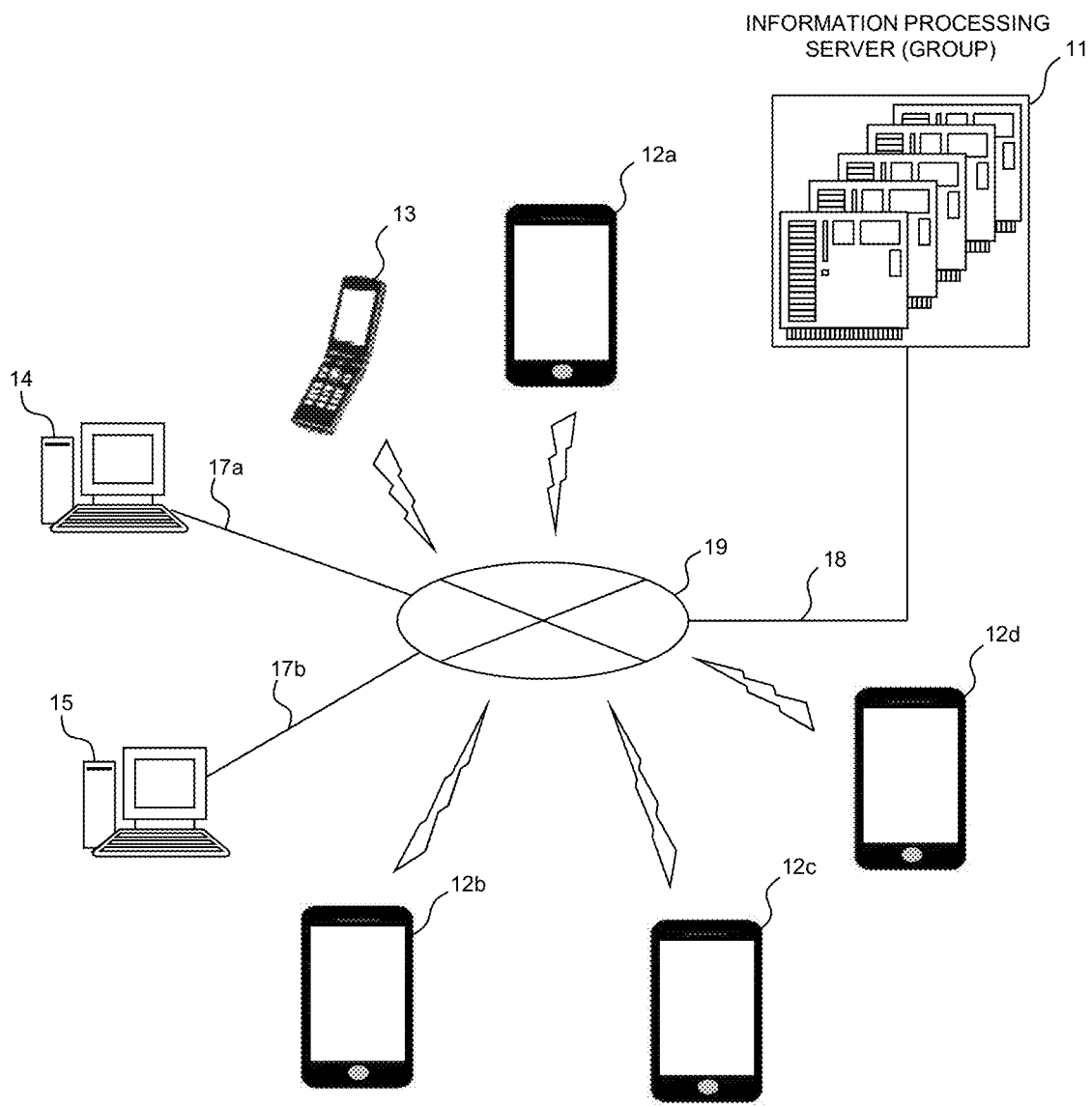
FIG. 1 illustrates an entire configuration example of a consumer item procurement support system according to one embodiment of the present invention.

[Basic Concept and Functional Configuration Example of Present Invention]

In one embodiment of the present invention, a mechanism of collecting unpurchased commodity information on a user (customer) is constructed using an image recognition technique (vision technique) having become widely used in recent years. Using the constructed mechanism complements information about unpurchased commodities conventionally difficult to be collected (commodities purchased not from the own company but from another company), thereby achieving a more appropriate commodity proposal and the like to the user (customer).

Consequently, a system according to one embodiment of the present invention includes the following major mechanisms ((1) to (3)) as configuration elements, and is configured such that their functions can be achieved (the details are described later by referring to the diagrams and the like).

(1) "Commodity Image Registration System (Server)" for Accumulating Image Feature Data on Commodities First, through a camera-function-equipped terminal or the like, images of all the commodities sold by a store are collected and registered, thereby accumulating data in the server.

From the accumulated commodity image data, feature amount data on each commodity is extracted, and further accumulated and stored.

(2) A function of extracting a feature amount from a commodity image acquired by the camera function of the terminal; the function may be an application implemented in the camera-function-equipped terminal that has the following function and used by the user (customer), or a service function implemented in an information processing server.

A function of extracting feature amount from commodity images acquired by a camera function of the terminal.

A function of matching the extracted feature amount with "commodity image feature database" in "commodity image registration system (server)" and of performing commodity matching.

A function of outputting and displaying a candidate commodity list extracted as a result of the commodity matching, on a terminal screen of the user (customer).

A function of allowing the user (customer) to select a commodity that may be registered as a purchased commodity, from the candidate commodity list output on the terminal screen.

A function of transmitting only the selected commodity information to "customer-specific experienced commodity information database" in "commodity proposal system (server)" and registering the information in this database.

(3) "Commodity proposal system (server)" having the following functions.

A function of registering and accumulating commodity information collected from the user (customer) by the image recognition in "customer-specific experienced commodity information database".

A function of registering and accumulating experienced commodity information on the own company's purchase, browse, search, commodity review registration and the like in "customer-specific experienced commodity information database".

A function of generating "customer-specific proposed commodity table" by referring to "repeatedly purchased commodity management database" and "recommended commodity management database" on the basis of the customer-specific experienced commodity information.

A function of issuing a notification about a proposed commodity and guiding the proposed commodity on a screen of the terminal used by the user (customer) or a dedicated web page screen, from "customer-specific proposed commodity table".

By cooperation of the mechanisms described above, more appropriate commodity proposals also including unpurchased commodity information having been difficult to be purchased are achieved.

[Another Application: Management in Refrigerator]

A consumer item procurement support system according to another embodiment of the present invention can also perform consumer item management in a refrigerator. The consumer item procurement support system according to one embodiment of the present invention can achieve cooperation also with a camera function and a communication-function-equipped refrigerator, not shown, and achieve refrigerator management on a customer-by-customer basis. It can be understood that this refrigerator management is easily applicable, in consideration of one embodiment of the present invention described later.

Hereinafter, a consumer item procurement support system according to one embodiment of the present invention is described in detail with reference to the drawings.

[Object Recognition Function]

First, although the present invention is not limited thereto, the consumer item procurement support system according to one embodiment of the present invention can identify and recognize a consumer item, such as a commodity, through the camera function included in the terminal (user terminal etc.) or an apparatus (the aforementioned refrigerator etc.). An existing object recognition process technique can be adopted as the recognition process in this case. The process routine is described with reference to FIG. 9.

Figure 9:
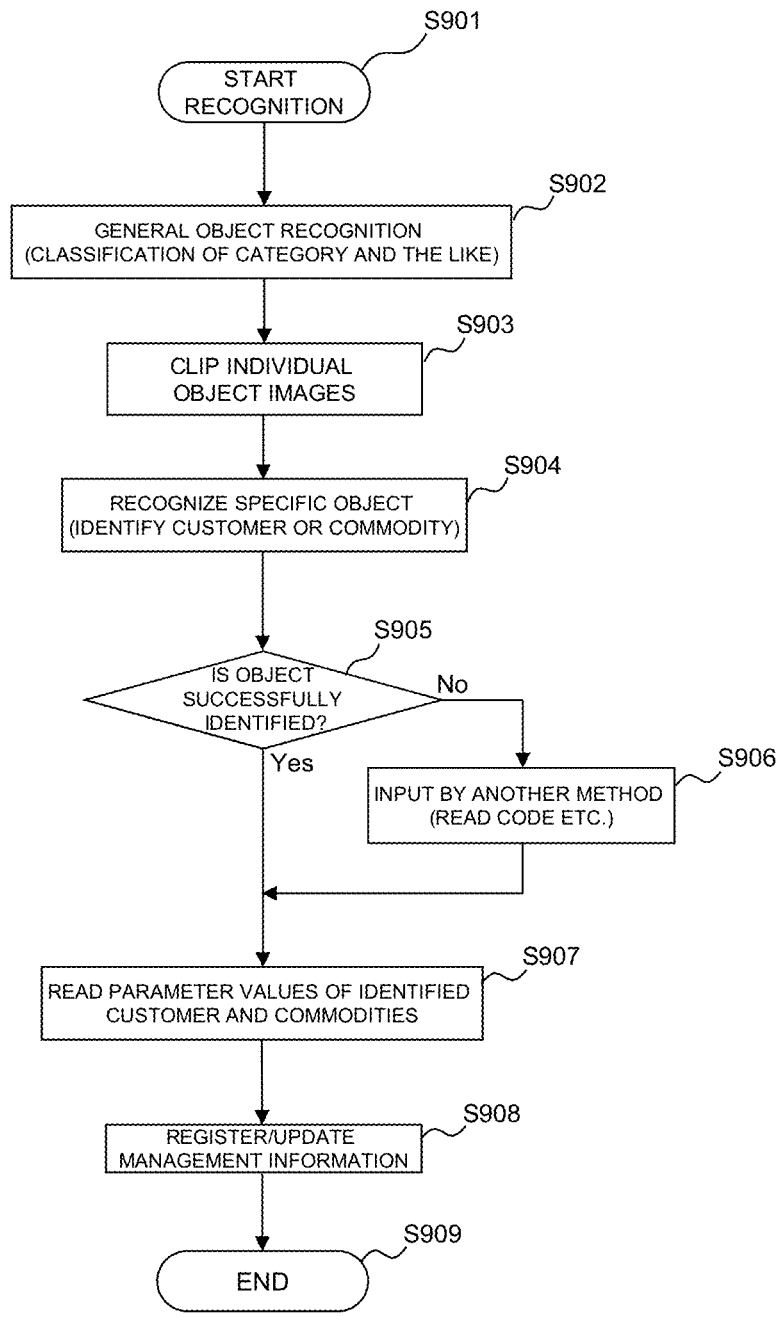
FIG. 9 illustrates an operation flow and a system processing flow in the consumer item procurement support system according to one embodiment of the present invention.

FIG. 9 shows, for example, a detailed processing flow example including a flow in a case of identifying an object (a consumer item, such as a commodity), by an object recognition process, from a still image or a moving image of a consumer item, such as a commodity, taken through the camera included in the terminal owned by the user (customer) and transmitted to an information processing server (described later). The object recognition process here can be achieved using a publicly known technique. According to typical procedures, first, a category of objects (whether a person or a consumer item, and whether a male or a female in the case of a person, and the category to which the consumer item belongs in the case of a consumer item) is identified by a general object recognition process, and then individual identification of the object (identification and the like of a commodity name in a case of a consumer item) is advanced using auxiliary data and the like.

In FIG. 9, after the processing starts in step S901, the processing proceeds to step S902, in which, first, a general object recognition process for classifying categories and the like is performed. For example, a method of BOF (Bag-Of-Features) can be adopted as the general object recognition process. In the general object recognition process, recognition of the category (the general name of the object) of the detected object is also performed.

Next, in step S903, a process of clipping an individual object image is performed. For example, if a consumer item in a cabinet at a sink is captured in an imaged frame, objects, such as "sink", "cabinet" and "(stored) consumer items (commodities)", are recognized at a stage of the general object recognition process, and "sink", "cabinet" and "commodities" in the frame are clipped in this step (however, what is required to be recognized in this flow is "(stored) consumer items (commodities)"; accordingly, images of "(stored) consumer items (commodities)" are sometimes sufficient for clipping). A specific object recognition process is performed for each of the clipped individual object images of the "(stored) consumer items (commodities)" (S904).

In the specific object recognition process in step S904, besides images of a single object and a face or the like of a person, setting data on multiple layers, such as CAD data on the commodity structure (these data items are stored in a database, not shown, in the information processing server) can be used. Feature points and feature amounts extracted from such images and setting data, and feature amount data generated from the scanned image (not only a still image but also a moving image in some cases) are compared with each other, and recognition as a specific object is performed. Here, the following two methods have mainly been known as methods of generating the feature amount data and methods of comparison.

The first is a method of generating images of mapping of three-dimensional information on each of minimum units (represented by setting data etc.) constituting the object, such as a commodity, onto a two-dimensional plane, at every angle, and of preliminarily generating feature amounts to be used for identifying a target object, from the mapped images. For example, a contour extraction method, SIFT method, SURF method or the like is adopted for the feature amount generation here. In the comparison process, based on the feature amounts, feature amounts are extracted from input images, and appearance positions, frequencies and the like are compared.

The second is a method of adopting, as an evaluation function, a process of mapping three-dimensional shape information made up of a set of minimum units (setting data etc.) constituting the object, such as a commodity, onto the two-dimensional plane, with the projection angle and magnification factor being changed, and determining the difference between the feature point of the object and the feature amount, as the degree of coincidence.

If the object is successfully identified using the publicly known methods described above (Yes in step S905), the processing proceeds to step S907. If not (No in step S905), the processing proceeds to step S906, in which an input process according to another method, such as reading of another code (commodity code etc.), is allowed in a case of a commodity.

In step S907, a parameter value (data itself representing the identified commodity) corresponding to the identified commodity or the like is read from the database of the information processing server.

Next, the processing proceeds to step S908, in which the read parameter value is associated with the status of the commodity, for example. As for this flow, the processing is finished (step S909).

Note that description of this flow is finished at step S909. It is, however, a matter of course that such a recognition process is continuously performed during operation of the system. Situation management information at home, such as a fact that a certain user (customer) has taken an image of a consumer item or the like in another room, and a fact that images of consumer items currently residing in a bathroom have been taken, is sequentially updated.

FIG. 1 shows an overall configuration example of the consumer item procurement support system according to one embodiment of the present invention.

As shown in FIG. 1, the consumer item procurement support system includes, as a configuration according to one embodiment: an information processing server (group) (hereinafter also called an information processing server 11); and various types of information processing apparatuses (in the diagram, for example, a mobile information terminal, or tablet terminals 12a to 12d mobile phone 13, and PCs 14 to 15; hereinafter sometimes collectively called "various terminals" or simply "terminals") respectively used by the user (customer), store staff members and the like as required. The information processing server 11 and the various terminals are connected to each other in a communicable manner by a dedicated line or a public line such as the Internet (17a to 19 as wired lines) as shown in FIG. 1. The lines may be wired or wireless. In the wireless case, the mobile information terminal or the tablet terminals 12a to 12d and the mobile phone 13 enter the Internet 19 wirelessly via a base station, an access point and the like, not shown, and are connected to the information processing server 11 in a mutually communicable manner via the line 18.

Here, the access point is a wireless device for connecting wireless terminals, such as PCs and smartphones, to each other, and for connecting these terminals to another network. Typically, this device operates according to communication protocols on the first layer (physical layer) and the second layer (data link layer) in the OSI reference model.

Note that many mobile phones, mobile information terminals or tablets at the time of application of the present application have a processing capability (a communication processing rate, an image processing capability, etc.) equivalent to that of a personal computer (PC), and should be called small-sized computers.

The program or software required to implement the present invention is, typically, installed or stored in an HDD, an SSD or the like in the storage of the PC or the mobile information terminal, is read, as all or some of software modules, on the memory in the storage as required during execution of the program or the software, and is computed and executed in a CPU.

Alternatively, a browser-based computer or a mobile information terminal can be adopted. In this case, a configuration is achieved where the program is distributed from another server or computer to the terminal as required, and a browser on the terminal executes this program.

Basically, the hardware configuration of the information processing server 11 can basically adopt a PC (described later with reference to FIG. 2, for confirmation). Note that the present invention is not limited thereto. The information processing server 11 can adopt a configuration where multiple (for example, several tens of to several tens of thousands of) PCs are operated in parallel to support large-scale data processing, in order to improve the hardware specifications as required.

On the other hand, according to a certain system configuration, some of the information processing terminals (terminals 14 and 15 and the like in a case of store-side (staff-side) terminals, for example) can be allowed to achieve some or all of the functions of the information processing server 11.

Figure 2:
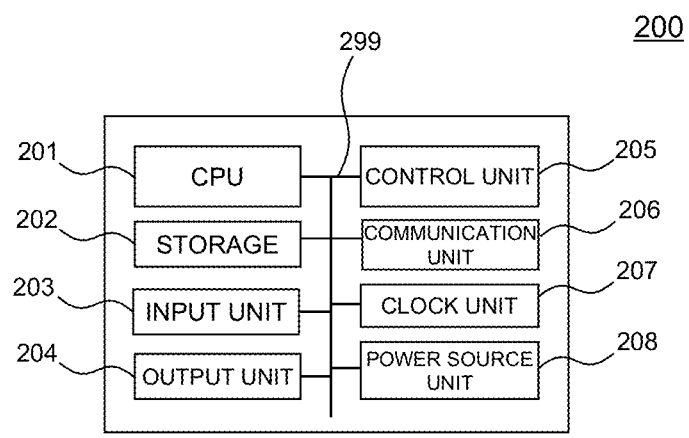
FIG. 2 illustrates a functional block configuration of an information processing server in the consumer item procurement support system according to one embodiment of the present invention.

FIG. 2 shows a functional block diagram of the information processing server 11 in the consumer item procurement support system according to one embodiment of the present invention. For example, the operation of the information processing server is achieved by individual operations of pieces of hardware described later, and by cooperation operation between the software and these pieces of hardware.

In FIG. 2, the information processing server 200, which is the entire hardware block, includes, in a roughly classified manner: a CPU 201 for performing various comparison and operation processes; a storage 202 including an RAM, an ROM, and a flash memory; an input unit 203 including a keyboard, and a pointing device; an output unit 204 including a display and a speaker; a control unit 205 for controlling various signals; a communication (interface) unit 206 (irrespective of distinction between wireless and wired schemes); a clock unit 207 for measuring time or the like; and a power source unit 208.

These modules are appropriately connected by a communication bus and a power feeder as required (in FIG. 2, for convenience sake, these lines are collectively represented as an association line 299).

The program or software to be executed on the information processing server 200 required to implement the present invention is, typically, installed or stored in any of a hard disk drive, an SSD (Solid State Drive), a flash memory and the like that constitute the storage 202, is read, as all or some of software modules, on the memory in the storage 202 as required during execution of the program or the software, and is computed and executed in the CPU 201.

Note that the computation and execution are not necessarily executed in a central processing unit, such as the CPU 201. Alternatively, an auxiliary operation unit, such as a digital signal processor (DSP), not shown, can be adopted.

Figure 3:
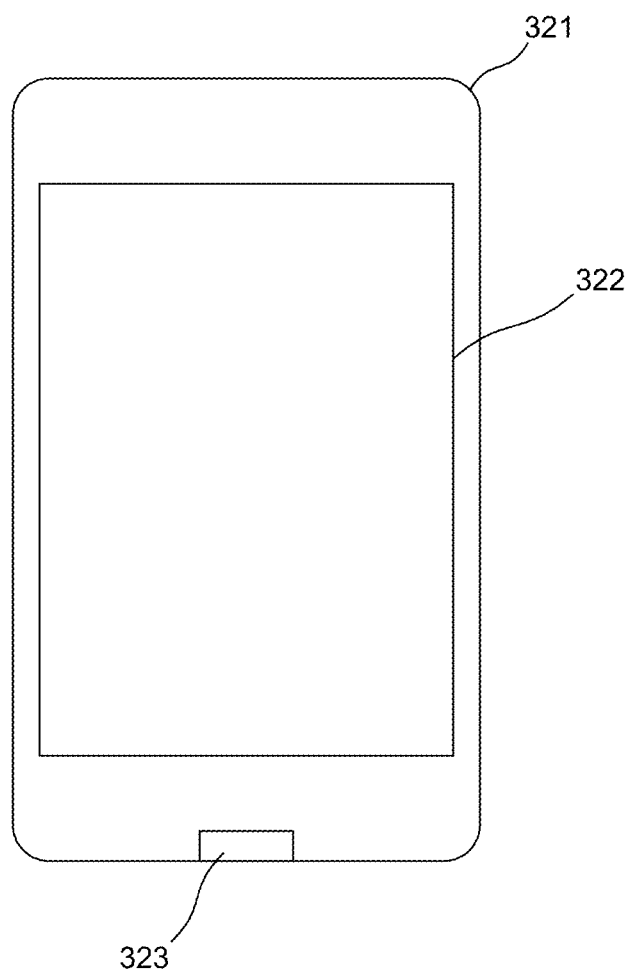
FIG. 3 illustrates an appearance configuration example of an information processing apparatus (user terminal) in the consumer item procurement support system according to one embodiment of the present invention.

FIG. 3 shows an appearance configuration of each of the tablet terminals 12a to 12d serving as the information processing apparatus in the consumer item procurement support system according to one embodiment of the present invention. In FIG. 3, the information processing apparatus (tablet terminal) 32 includes a housing 321, a display 322, and a hardware button 323 provided at a center of a lower portion of the housing 321. The display 322 typically includes a liquid crystal display (LCD) or the like, and can display various pieces of information, such as characters, still images and moving images. A menu button and a software keyboard may be displayed on the display 322; by touching them with a finger, a touch pen (not shown) or the like, an indication (command) for the tablet terminal 32 is achieved. In view of this point, the hardware button 323 is not an indispensable configuration element. For the sake of convenience of describing the present invention, the button is implemented as a button for achieving a certain function. It is a matter of course that such hardware button 323 may be replaced with a menu button displayed at a part of the display 322.

The display 322 includes a multi-touch input panel. Touch input position coordinates on the touch input panel are transmitted to the processing system (CPU) of the tablet terminal 32 via an input device interface (not shown), and are processed. The multi-touch input panel is configured so as to be capable of simultaneously detecting multiple contact points on the panel. The detection (sensor) can be achieved by any of various methods, and is not necessarily limited to a contact sensor. The indication point to the panel can be extracted using an optical sensor, for example. Not only the contact sensor and the optical sensor, but also a capacitive sensor that senses contact with human skin can be adopted instead.

Although not shown in FIG. 3, the tablet terminal 32 may include a microphone and a speaker. In this case, the user's voice or the like picked up by the microphone can be adopted as an input command. Although not shown in FIG. 3, a camera device, such as CMOS, can be mounted on the back surface or the like of the tablet terminal 32 (hereinafter, possible description of taking a certain image by the information processing apparatus or the user terminal means that an object is imaged through the camera device).

Figure 4:
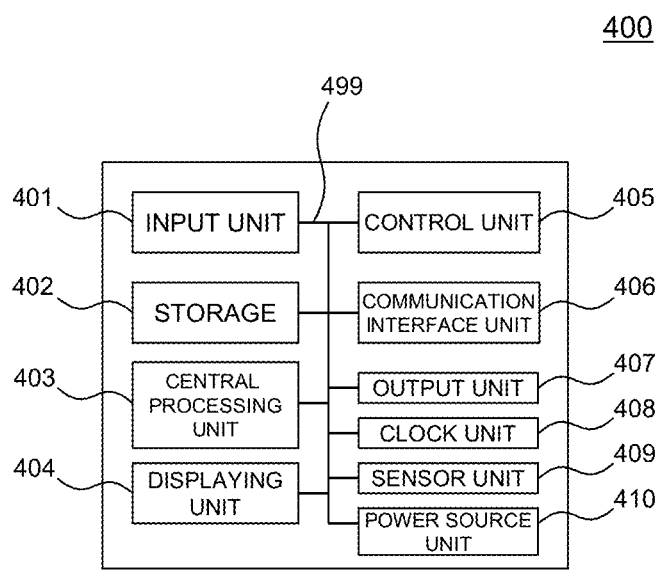
FIG. 4 illustrates a functional block configuration of hardware of the information processing apparatus (user terminal) according to one embodiment of the present invention.

FIG. 4 exemplifies a functional block diagram of hardware constituting the tablet terminal 32 according to one embodiment of the present invention. The operation of the tablet terminal 32 is achieved by individual operations of pieces of hardware described later, and by cooperation operation between the software and these pieces of hardware.

In FIG. 4, the tablet terminal 400, which is the entire hardware block, includes, in a roughly classified manner: an input unit 401 that includes the hardware button 323 shown in FIG. 3, the multi-touch input panel provided on the display 322, and the microphone; a storage 402 that includes a hard disk, RAM and/or ROM and the like for storing the program, data and the like; a central processing unit 403 that includes an CPU performing various types of numerical calculation and logical operation through the program, a displaying unit 404 that includes the display 322 or the like; a control unit 405 for controlling the chip, electric system and the like; a communication interface unit 406 that includes a slot for accessing the Internet, a port for performing optical communication, and a communication interface; an output unit 407 that includes a speaker, a vibrator, and an infrared projector; a clock unit 408 for measuring time or the like; a sensor unit 409 that includes an image sensor, such as a CMOS, an infrared sensor, an inertial sensor and the like; and a power source unit 410 for supplying power source to each module in the apparatus. These modules are appropriately connected by a communication bus and a power feeder as required (in FIG. 4, for convenience sake, these lines are collectively represented as an association line 499).

Note that the sensor unit 409 may include a GPS sensor module for identifying the position of the tablet terminal 400 (12a to 12d). Signals detected by the image sensor, such as CMOS, the infrared sensor and the like constituting the sensor unit 409 can be processed as input information at the input unit 401.

The program or software to be executed on the tablet terminal 400 required to implement the present invention is, typically, installed or stored in any of a hard disk drive, an SSD (Solid State Drive), a flash memory and the like that constitute the storage 402, is read, as all or some of software modules, on the memory in the storage 402 as required during execution of the program or the software, and is computed and executed in the CPU 403.

Note that the computation and execution are not necessarily executed in a central processing unit 403, such as the CPU. Alternatively, an auxiliary operation unit, such as a digital signal processor (DSP), not shown, can be adopted.

[Server and Database etc. Constituting Information Processing Server Group]

The information processing server (group) 11 in the consumer item procurement support system according to one embodiment of the present invention is not limited thereto (for example, a user (customer) management DB and the like, not shown). As major elements, the following various servers, databases (hereinafter also called DB) and the like are constructed. Triggered by a request or the like issued by each of various terminals described later with reference to FIG. 2, reference or access is performed directly or indirectly.

[A] Commodity Image Registration Server

In this server, image data on all consumer items (commodities) that can be handled not only by the own company (own store) but also by another company (another store) are registered and managed. Handling encompasses not only selling in the store, but also electronic commerce via a network. In one embodiment, this server includes the following databases or tables.

(a) Commodity Image DB

In this DB, one or more image data items (image objects) for each commodity SKU (Stock Keeping Unit) are managed and stored as an image file (jpg file etc.).

(b) Commodity Image Feature Amount DB

In this DB, feature amounts (represented by $X_{11}$, $X_{12}$, $X_{13}$, $X_{14}$, ..., $X_{21}$, $X_{22}$, $X_{23}$, $X_{24}$ ... and the like) in one or more image objects managed with respect to each commodity SKU are managed and stored.

Note that DBs in (a) and (b) described above are also called "commodity image feature database".

[B] Commodity Information Management Server

In this server, attribute information, such as "commodity name", "commodity price", is registered and managed with respect to each commodity SKU. In one embodiment, this server includes the following databases or tables.

(a) Commodity Information Master Table

Attribute information, such as "commodity name" and "commodity price", is managed and stored.

[C] Commodity Proposal Server

In this server, "commodity SKU (that can be associated with a commodity code, such as JAN)", "purchase presence flag (a date can be registered if present)", "browsing presence flag (a data can be registered if present)", "search presence flag (a date can be registered if present)", "review presence flag (a date can be registered if present)", "image registration presence flag (a date can be registered if present)" and the like are recorded and managed with respect to each customer (customer ID). With reference to another table and the like, a commodity proposal optimal for the user (customer) is performed. In one embodiment, this server includes the following databases or tables.

(a) Customer-Specific Experienced Commodity Information DB

The aforementioned "commodity SKU (that can be associated with a commodity code, such as JAN)", "purchase presence flag", "browsing presence flag", "search presence flag", "review presence flag", "image registration presence flag" and the like with respect to each customer (customer ID) are managed and stored. The commodity information DB is for managing behavior histories (behavior experiences) for commodities on a customer-by-customer basis.

This DB cooperates with "purchase experience DB", "browse experience DB", "search experience DB", "commodity review experience DB" and "image registration commodity information DB", which are described later. As these DBs are updated, a customer-specific experienced commodity information DB is appropriately updated and managed accordingly.

(b) Repeatedly Purchased Commodity Management DB

The number of repeat purchases on a customer-by-customer basis or a commodity-by-commodity basis is managed and stored. Furthermore, related information, such as dates and areas on and in which the commodity is purchased, are managed and stored together.

(c) Commodity Recommendation Management DB

Recommendation information on a customer-by-customer basis or commodity-by-commodity basis is managed and stored.

(d) Customer-Specific Proposed Commodity Table

For each customer, commodities to be recommended are, for example, ranked on a case-by-case basis with respect to various parameters and experiences, and are thus managed and stored.

(e) Purchase Experience DB

Purchase experience information on a customer-by-customer basis or commodity-by-commodity basis is managed and stored. Specifically, this DB cooperates with a store terminal (or a store server) and an electronic commerce server, not shown, and is updated when a purchase (sale) experience occurs.

(f) Browse Experience DB

Browse experience information on a web sales page on a customer-by-customer basis or commodity-by-commodity basis is managed and stored.

(g) Search Experience DB

Search experience information on the web sales page on a customer-by-customer basis or commodity-by-commodity basis is managed and stored.

(h) Commodity Review Experience DB

Commodity review experience information on the web sales page on a customer-by-customer basis or commodity-by-commodity basis is managed and stored.

(i) Image Registration Commodity Information DB

This DB is one of characteristic DBs in one embodiment of the present invention. For example, among commodities identified through indication by the user (customer) via the user terminal and then image-recognized, information about commodities having already been purchased is managed and stored.

The servers described above update and manage the DBs and tables managed by the servers themselves, and cooperate with each other to constitute the information processing server (group) 11 shown in FIG. 2.

Figure 5:
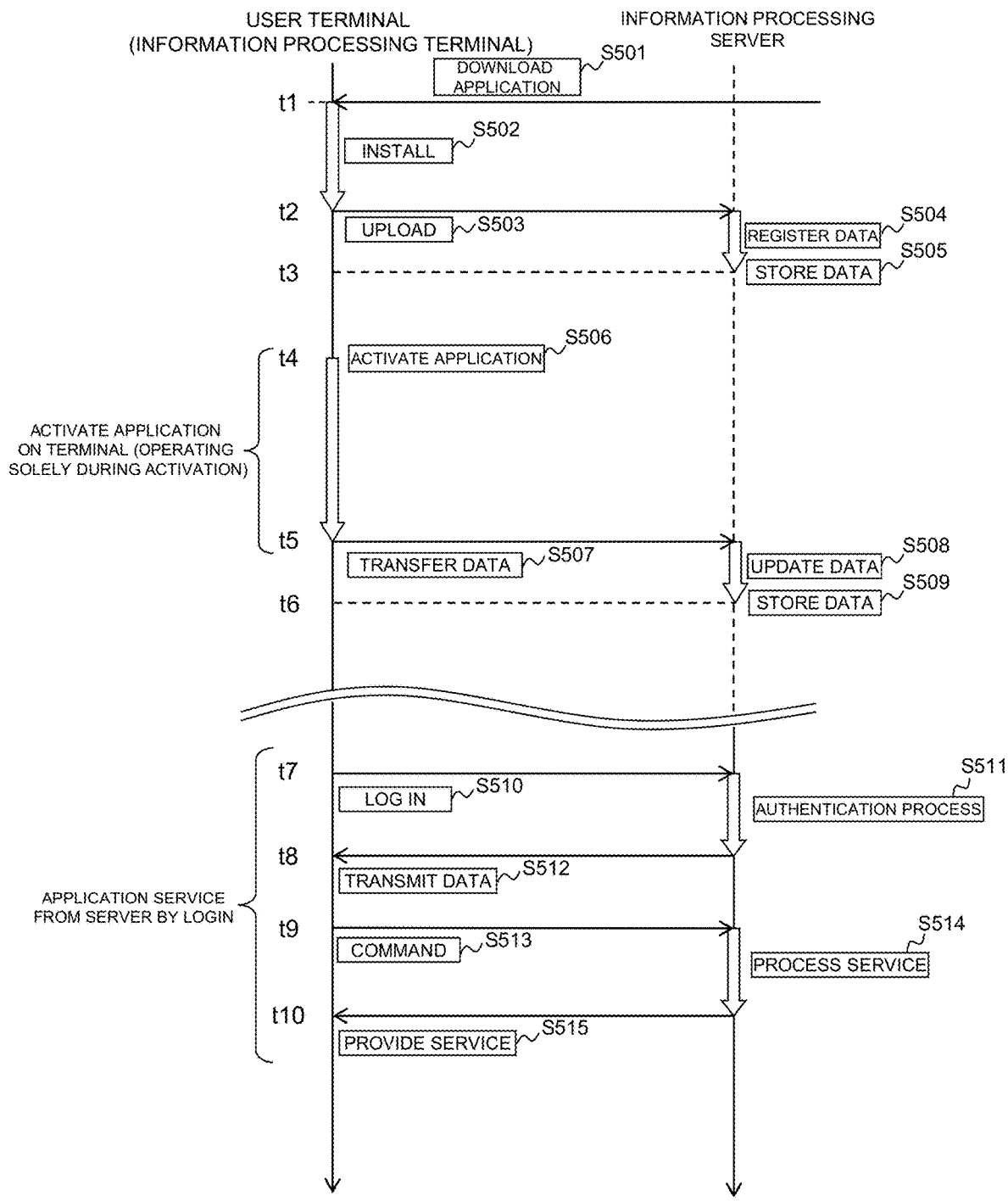
FIG. 5 illustrates a variation in a basic operation processing flow in the consumer item procurement support system according to one embodiment of the present invention.

Next, FIG. 5 shows a variation of a basic operation in the system, apparatus or the like according to one embodiment of the present invention exemplified in FIG. 1.

In FIG. 5, "user terminal" corresponds to the terminal 12a or the like in FIG. 1. "Information processing server" corresponds to the information processing server (group) 11 in FIG. 1. In FIG. 5, t1 to t10 indicate a flow of time series. Operations and processes described later are temporally performed.

Note that the operations or processing times (t1 etc.) exemplified in the embodiment are exemplified for the sake of facilitating understanding of the concept of the present invention, and the present invention is not limited to a specific time-series relationship exemplified in the embodiment.

First, at the date and time t1, the user (customer) downloads application software for causing the own user terminal to operate as an information processing terminal according to the present invention, from the information processing server via the user terminal (step S501). This application software is client software or application software for processing a part or the whole of the program according to the present invention. The downloaded application software is then installed in the user terminal (step S502). At this time, at time t2, besides an email address of the user themselves, profile information shown in the following table may be allowed to be uploaded to the information processing server from the user terminal as required (step S503), and then registered and managed therein (step S504).

TABLE 1

| Name (User name) | Membership number (ID) | Email address (Mobile phone number) | Gender | Age (Age band) | Resident area (Area etc.) |
| --- | --- | --- | --- | --- | --- |

The data items described above are stored, as user data, in the storage device (a customer management DB etc., not shown) in the information processing server (step S505). At time t3 and thereafter, the user (customer) can start the application (the server starts to provide a service for the terminal) by the user (customer) operating the information processing terminal.

Next, the user having downloaded and installed the application in the user terminal activates the application software at time t4 (step S506). From time t4 to time t5, for example, the user receives, from the information processing server, the service provided for the information processing terminal.

Figure 6:
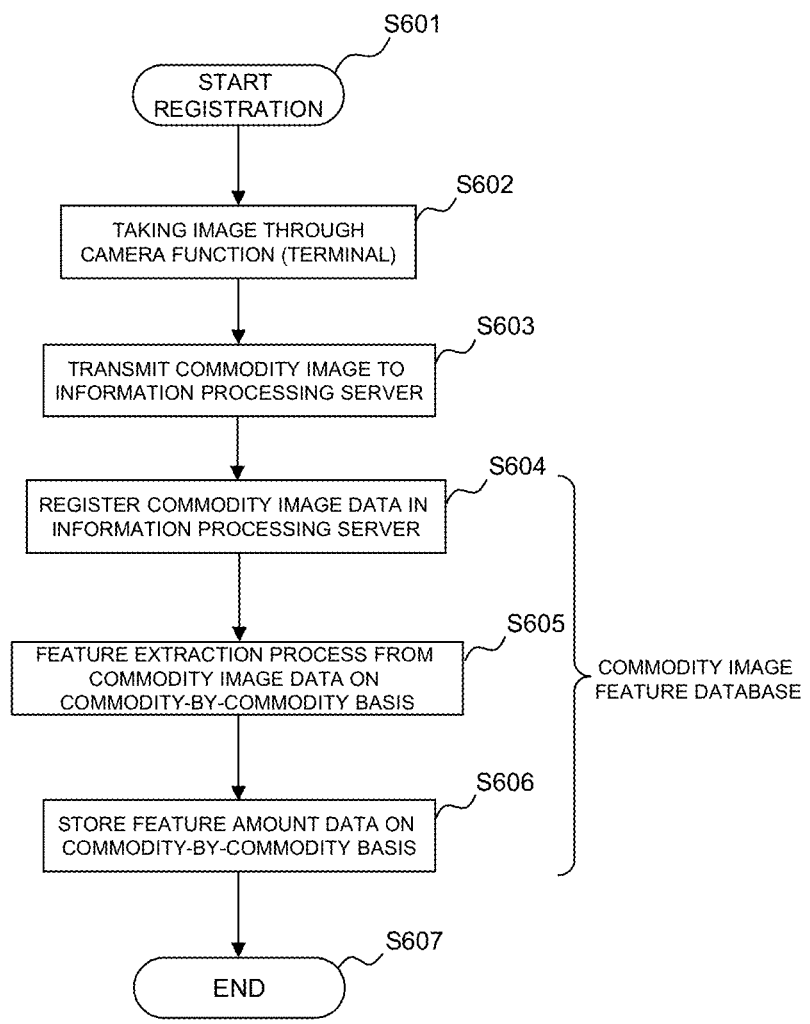
FIG. 6 illustrates an operation flow and a system processing flow in the consumer item procurement support system according to one embodiment of the present invention.

At time t5, the user once terminates or finishes the application software according to one embodiment of the present invention. At this time, as required, status information on the application is transferred to the information processing server (step S507), and the server receives this, and updates (step S508) and stores (step S509) the status information as the user information on the user. In FIG. 6, these processes are completed by time t6.

Note that a mode can be adopted where after the application software according to one embodiment of the present invention is installed in the information processing terminal, at least a part thereof can be executed in the terminal in a closed manner. In this case, step S504 to step S505 and step S508 to step S509 can be omitted. If there is required information, the information is stored and managed on the memory in the terminal.

Next, in FIG. 5, from time t7 to time t10, an example of an embodiment is shown where at least a part of the application software according to one embodiment of the present invention is executed by the information processing server. In this case, the user (customer) performs two typical user terminal operations that are a login operation and command transmission, and receives required data transmitted from the information processing server, or is provided with a service.

For example, at time t7 in FIG. 5, the user performs a process of logging in the server through the own information processing terminal (step S510), and the information processing server appropriately performs a required authentication process (step S511), and at time t8, transmits data for allowing the user to be provided with the service (step S512). For example, the data includes a top menu screen configured to be capable of receiving a command from the terminal, an application activation screen and the like.

At time t9, the user transmits a certain command through the information processing terminal (step S513). This command may be selection from a menu displayed on the menu screen, and may sometimes be a start command for starting the application in the case of the application activation screen. Upon receipt of the command, the server starts a service process (step S514). At time t10, a service responding to the request by the terminal is provided from the server for the terminal (step S515).

Although not shown in FIG. 5, also after time t10, a command can be transmitted from the terminal as required (for example, a message transmission command, a menu selection command, etc.), and every time of the transmission, the server receives the command from the terminal, and provides the service (for example, transfers the received message to another terminal, and analyzes the message and replies with the result thereof).

Figure 7:
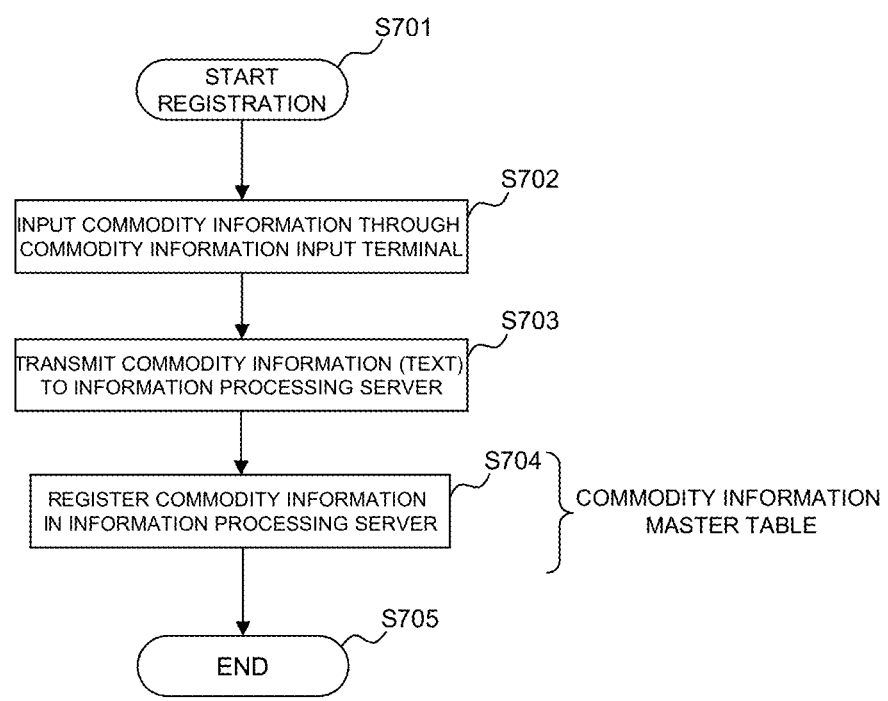
FIG. 7 illustrates an operation flow and a system processing flow in the consumer item procurement support system according to one embodiment of the present invention.

Next, referring to FIGS. 6 to 7, a commodity information registration processing flow in the consumer item procurement support system according to one embodiment of the present invention is described. The commodity information registration processing flow roughly includes two types. One (although the present invention is not limited thereto) is a flow of collecting and registering commodity image information through the camera function of the information processing apparatus that is a terminal or the like, manually by a store staff member or the like (described later with reference to FIG. 6). The other (likewise, although the present invention is not limited thereto) is a flow of input and registration as text information or the like from the information processing apparatus, such as the information terminal, manually by the staff member or the like (described later with reference to FIG. 7).

The registration process is started in step S601 in FIG. 6, and the processing proceeds to step S602, in which a commodity image is taken into the terminal using the camera function of the terminal by the staff member or the like. Next, the processing proceeds to step S603, in which commodity image data captured in the terminal is transmitted to the information processing server (for example, the commodity image registration server in the group).

In the information processing server, the commodity image data is registered (step S604). At this time, in one embodiment, in the server, management is performed in the commodity image DB according to a data structure in the following table.

TABLE 2

| Commodity SKU | Image object | (Link to) Image file |
|---|---|---|
| A111 | Object A1 | A1.jpg |
|  | Object A2 | A2.jpg |
| B111 | Object B1 | B1.jpg |
|  | Object B2 | B2.jpg |
| C111 | Object C1 | C1.jpg |
|  | Object C2 | C2.jpg |
| ... | ... | ... |

Here, "object" is one image for one commodity (imaging of one commodity in multiple views increases the number of objects accordingly; six images in a case of a six-view drawing). The objects are then associated with respective image files (for example, jpg files). Data on the image files themselves are stored in another memory area.

In step S605, in the information processing server, a feature extraction process is performed from the commodity image data (made up of multiple image objects as described above) on a commodity-by-commodity basis. The feature extraction process analyzes the commodity image data, and extracts the feature amount in the commodity image. Specifically, the feature amount as in the following table is extracted, and managed and stored in the commodity image feature DB.

TABLE 3

| Commodity SKU | Image object | Feature amount |
|---|---|---|
| A111 | Object A1 | $X_{11}, X_{12}, X_{13}, X_{14}, \ldots$ |
|  |  | $X_{21}, X_{22}, X_{23}, X_{24}, \ldots$ |
|  |  | ... |
|  | Object A2 | $X_{51}, X_{52}, X_{53}, X_{54}, \ldots$ |
|  |  | $X_{61}, X_{62}, X_{63}, X_{64}, \ldots$ |
|  |  | ... |
| B111 | ... | ... |
| C111 | Object C1 | $Y_{11}, Y_{12}, Y_{13}, Y_{14}, \ldots$ |
|  |  | $Y_{21}, Y_{22}, Y_{23}, Y_{24}, \ldots$ |
|  |  | ... |
|  | Object C2 | $Y_{81}, Y_{82}, Y_{83}, Y_{84}, \ldots$ |
|  |  | $Y_{91}, Y_{92}, Y_{93}, Y_{94}, \ldots$ |
|  |  | ... |
|  | ... | ... |
| ... | ... | ... |

As in the above table, the feature amount is analyzed and extracted with respect to each image object of one commodity.

In one embodiment, the feature amount extracted in step S605 is orderly arranged as in the above table, and managed and stored on a commodity-by-commodity basis (step S606).

The data described above is managed and stored in the commodity image feature database (including the commodity image DB and the commodity image feature amount DB).

Next, the processing proceeds to S607; as for this flow, the processing is finished.

FIG. 7 shows a flow of input and registration of the commodity information, as text information or the like, from the information processing apparatus, such as the information terminal, manually by the staff member or the like. When the registration process is started in step S701, the processing proceeds to step S702, in which the commodity information is input from the commodity information input terminal (information processing apparatus). Typically, the information is input as text.

Next, the commodity information input into the terminal is transmitted to the information processing server (step S703), and is registered as commodity information in the information processing server (step S704).

The commodity information registered in the information processing server is orderly arranged in a table that is the following table, for example, and managed and stored.

TABLE 4

| Commodity SKU | Commodity name | Commodity price | Size |
|---|---|---|---|
| A111 | Soy sauce A | ¥320 |  |
| B111 | Soy sauce B | ¥267 |  |
| C111 | Vinegar X | ¥127 |  |
| D111 | Vinegar Y | ¥270 |  |
| ... | ... | ... |  |

Next, the processing proceeds to S705; as for this flow, the processing is finished.

Figure 8:
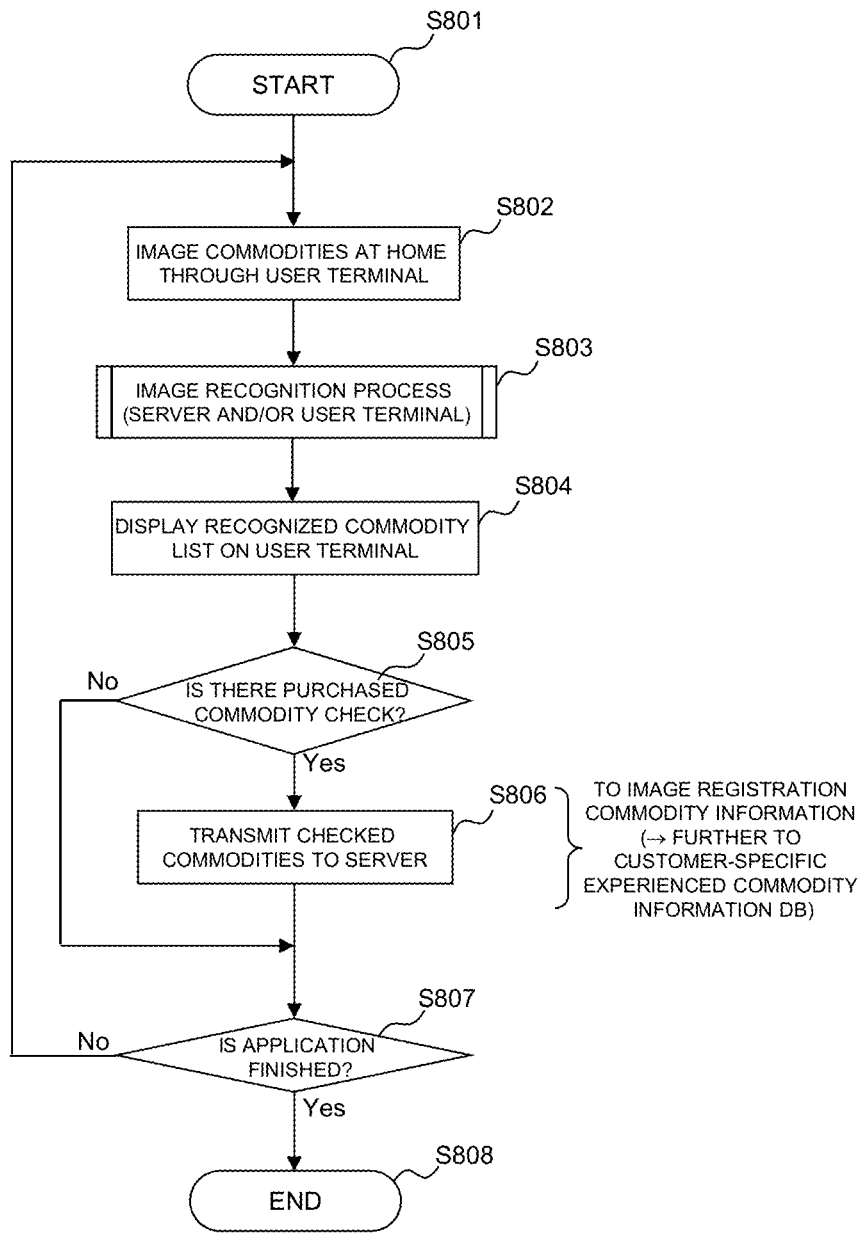
FIG. 8 illustrates an operation flow and a system processing flow in the consumer item procurement support system according to one embodiment of the present invention.
Figure 10:
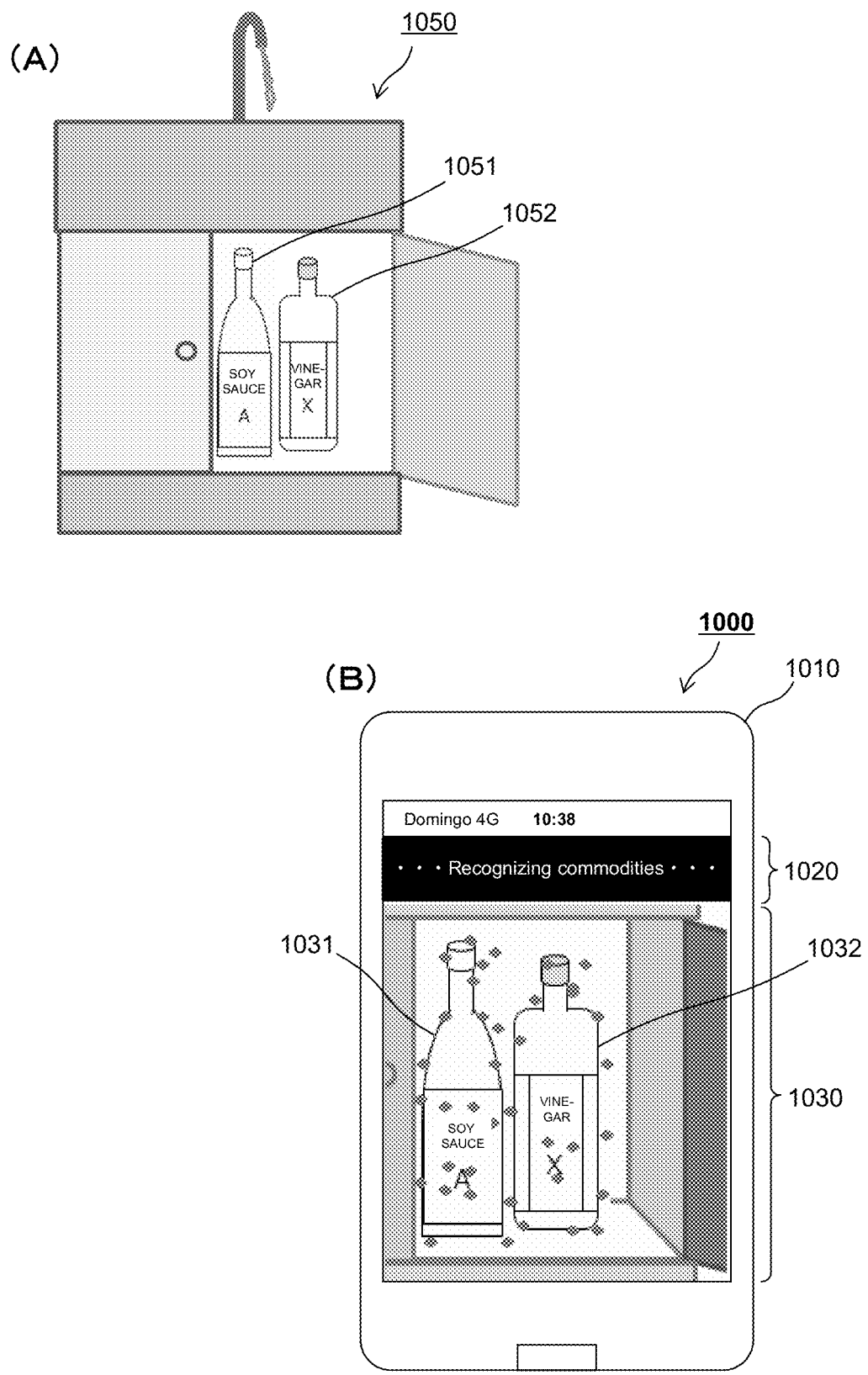
FIG. 10 illustrates a display example of the information processing apparatus (user terminal or customer terminal) in the consumer item procurement support system according to one embodiment of the present invention.
Figure 11:
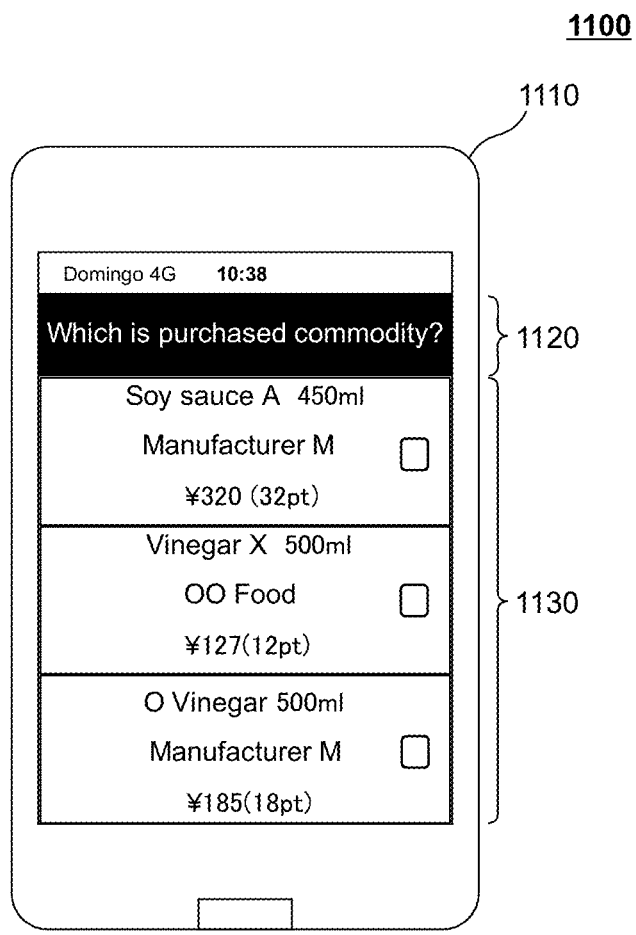
FIG. 11 illustrates a display example of the information processing apparatus (user terminal or customer terminal) in the consumer item procurement support system according to one embodiment of the present invention.
Figure 12:
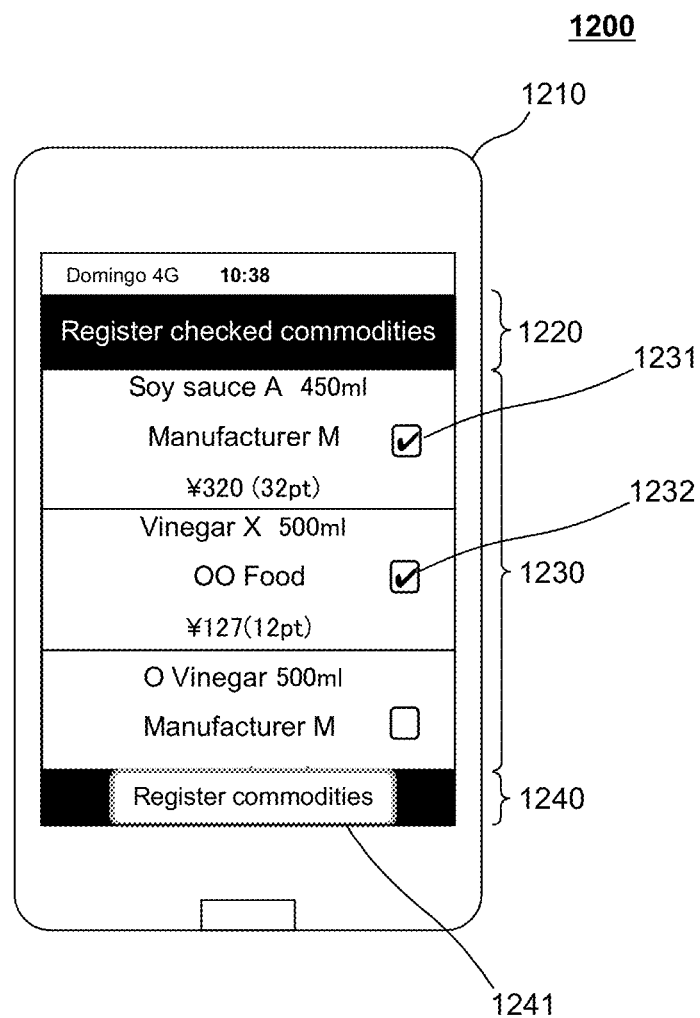
FIG. 12 illustrates a display example of the information processing apparatus (user terminal or customer terminal) in the consumer item procurement support system according to one embodiment of the present invention.

FIG. 8 shows a commodity recognition process flow in the user terminal in the consumer item procurement support system according to one embodiment of the present invention. Description is hereinafter made with reference to user terminal screen examples (FIGS. 10 to 12).

The processing starts in step S801, and the processing proceeds to step S802, in which commodities (consumer items) in the user's home are imaged by the user terminal. The situations are exemplified in FIGS. 10(A) and 10(B). FIG. 10(A) shows the situations of a kitchen in the user's home. In FIG. 10(A), a sink 1050, and commodities (consumer items) 1051 and 1052 in the sink cabinet are shown. For example, it is assumed that reference numeral 1051 denotes Soy sauce A, and reference numeral 1052 denotes Vinegar X. The user takes images thereof through the camera function of the user's terminal. The situations are shown in FIG. 10(B). In FIG. 10(B), accompanied by a message 1020 " . . . Imaging commodities . . . ", an image 1030 during imaging (having been imaged) is displayed on the display unit on a housing 1010 of the user terminal 1000. Soy sauce A (1031) and Vinegar X (1032) in the sink cabinet are imaged in the image 1030. Note that reference numeral 1031 corresponds to reference numeral 1051, and reference numeral 1032 corresponds to reference numeral 1052. Furthermore, situations are shown where contour points or feature points of the objects 1031 and 1032 in the image 1030 are plotted by the image recognition module in the user terminal 1000 or the image recognition service module in the information processing server (many points in FIG. 10

(B)). Note that these contour points or feature points are exemplified for a stage before the image recognition process, and are not indispensable representation. There are various display methods according to image recognition process schemes.

Note that in a case where these image recognition processes are executed by the service module in the information processing server, still images or moving images taken by the user terminal 1000 are sequentially transmitted to the information processing server, and a result having been recognized (or being recognized) in the information processing server is fed back to the user terminal 1000 substantially in real time.

In step S803, the object recognition process for the objects 1031 and 1032 in the image 1030 is executed by the image recognition module in the user terminal 1000 and/or the image recognition service module in the information processing server. The specific example thereof has already been described with reference to FIG. 9.

In step S804, a list of recognized commodities (consumer items) is displayed on the screen of the user terminal. The situations are exemplified in FIG. 11. In FIG. 11, accompanied by a message 1120 "Which is the purchased commodity?", the recognized commodities (consumer items) are displayed in a list display field 1130 on the display unit on the housing 1110 of the user terminal 1100. Situations where "Soy sauce A 450 ml", "Vinegar X 500 ml" and "O Vinegar 500 ml" are displayed in the display field 1130.

It should be noted that the list of commodities (consumer items) displayed in the list display field 1130 are candidates of commodities (consumer items) recognized by the system but are not securely identified commodities.

Next, the processing proceeds to step S805, in which an input of commodities (consumer items) actually purchased by the user among the candidates of the commodities (consumer items) displayed in the list display field 1130 is accepted. If there is an indication (check) on the purchased commodities in this step (in a case of Yes), the processing proceeds to step S806. On the contrary, if there is no indication (check) (in a case of No), the processing skips to step S807.

Here, referring to FIG. 12, situations where purchased commodities are indicated (checked) are exemplified. In FIG. 12, accompanied by a message 1220 "Register checked commodities", "Soy sauce A 450 ml" and "Vinegar X 500 ml" and "O Vinegar 500 ml displayed in the list display field 1230, are displayed on the display unit on the housing 1210 of the user terminal 1200.

The user has actually purchased the commodities (consumer items) 1051 and 1052 in the cabinet of the sink 1050. Accordingly, the user checks check fields 1231 and 1232 for corresponding commodities among the recognized candidate commodities (at this time, control can be made so as to display the message 1220 described above and a button 1241 described later).

The commodity registration button 1241 is displayed in a button display field 1240. By the user pressing the button, the already checked commodities at the time are uploaded as commodities purchased by the user, to the information processing server (step S806). Processing then proceeds to step S807.

In step S807, it is determined whether to finish the application or not. If it is to be finished (Yes), the processing proceeds to step S808, in which this flow is finished. If not (No), the processing returns to step S802.

In one embodiment, the purchased commodity information transmitted to the information processing server in step S806 are registered (newly added) in the image registration commodity information DB of the commodity proposal server, and are managed in the customer-specific experienced commodity information DB, as required.

Here, it is important that information about commodities (consumer items) that have not been purchased from the own company or the own store (system provider side) but have been purchased from another company or another store, among "commodities purchased by the user" extracted in step S805 and step S806 and managed in the database, can also be extracted and managed. This point complements information about unpurchased commodities conventionally difficult to be collected (commodities purchased not from the own company but from another company), thus achieving a more appropriate commodity proposal and the like to the user (customer).

[Structure of Customer-Specific Experienced Commodity Information DB]

In one embodiment of the present invention, the structure of the customer-specific experienced commodity information DB complemented with information about the unpurchased commodities is as shown in the following table.

TABLE 5

| Customer ID | Commodity SKU | Purchase | Browse | Search | Review | Image registration | Date |
|---|---|---|---|---|---|---|---|
| C001 | A001 | ○ | | | | | 2015 Mar. 21 |
| C001 | B004 | | ○ | ○ | | | 2016 Nov. 5 |
| C001 | A111 | | | | | ○ | 2017 Jul. 7 |
| C001 | C111 | | | | | ○ | 2017 Jul. 7 |
| C002 | M001 | ○ | | | | | 2017 Jul. 7 |
| C002 | M002 | ○ | | | | | 1999 Dec. 25 |
| C002 | X008 | | | | ○ | | 2002 Nov. 3 |
| C002 | T010 | ○ | | | | | 2005 Apr. 15 |
| C003 | D890 | ○ | ○ | | | | 2017 Jun. 2 |
| ... | ... | ... | ... | ... | ... | ... | ... |

In the above table, "customer ID" is an identifier on a customer-by-customer basis, and "commodity SKU" is an unit for constituting the commodity and can be associated with an identification code, such as a JAN code.

"Purchase" is the purchase presence flag, and serves as flag information on whether or not purchase has been made from the own company (own store) in one embodiment (if present, purchase date can be registered; hereinafter, the same applies to the flag present item). Note that "Purchase" encompasses not only purchase in a store but also purchase through electronic commerce.

"Browse" is the browsing presence flag on a web site of the own company (own store). "Search" is the search presence flag on the web site of the own company (own store). "Review" is a review description presence flag on the web site of the own company (own store). If present, link to or association with a review comment is made.

"Image" is the image registration presence flag. "Date" includes, for example, the latest update date or the like of the record concerned.

Here, "commodities purchased by the user" extracted in step S805 and step S806 and is managed in the database are commodities A111 and C111 purchased by a customer C001. Each image registration commodity information flag is on (symbol O). The purchase presence flags for commodities A111 and C111 are off. Accordingly, it can be understood that the commodities A111 and C111 have been purchased not from the own company (own store) but from another company.

As described above, the fact that the commodities (consumer items) purchased not from the own company (own store) but from another company have already been provided in the user's home can be managed by separately providing a flag (another company purchase flag).

In a case where the remaining quantity of the recognized commodities (consumer items) (that is the remaining quantity in a commodity container; hereinafter, the same applies) can be recognized, the remaining quantity can be digitized (for example, on percentage or the like) and managed irrespective of whether the commodities have been purchased from the own company (own store) or purchased from another company. Separately managed "consumption period (an average period until expenditure of commodities) on a commodity-by-commodity basis" not shown, or "consumption period (an average period until expenditure by the user) on a customer-by-customer basis" not shown are referred to, and then the digitized remaining quantity information can be used for recommendation information described later.

Figure 13:
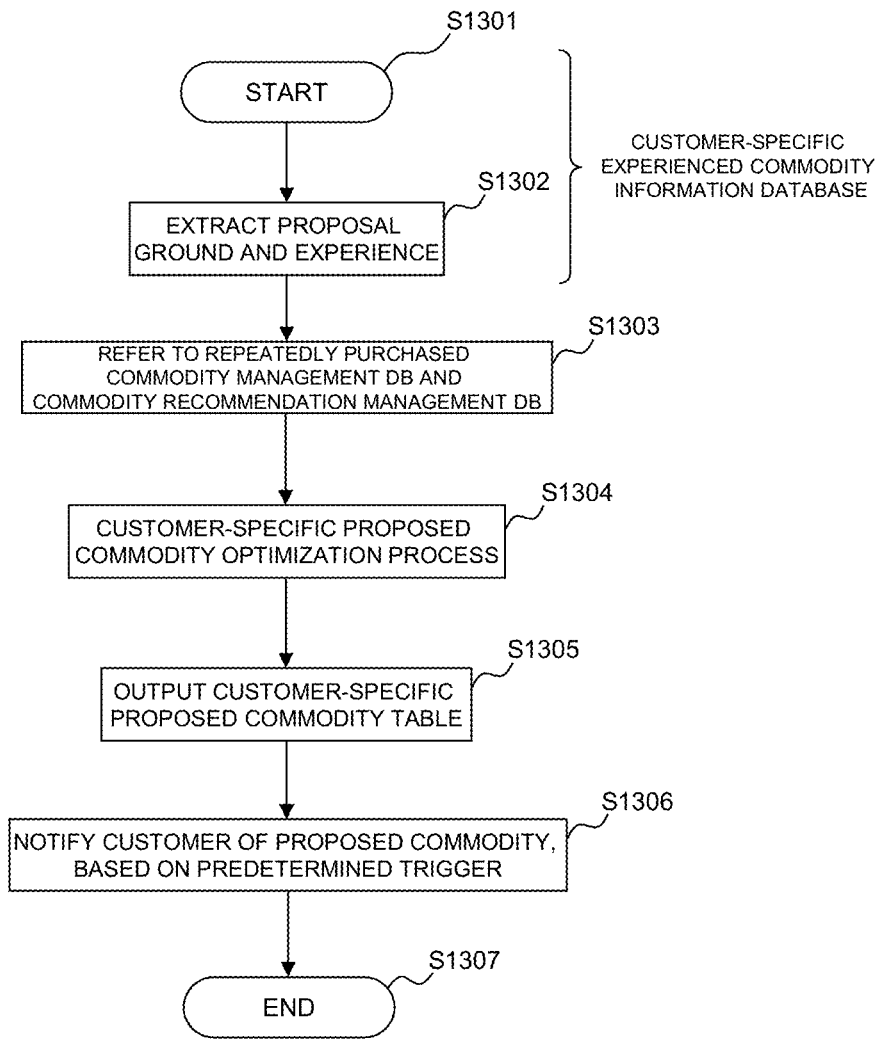
FIG. 13 illustrates a processing flow in the consumer item procurement support system according to one embodiment of the present invention.

FIG. 13 shows a commodity proposal processing flow for the user (customer) in the consumer item procurement support system according to one embodiment of the present invention. This process can be started at any timing by a system administrator. In one embodiment, the timing is defined periodically/irregularly, or with actions by the user (customer), such as purchase, browse, search, and image registration, being adopted as triggers.

Although the present invention is not limited thereto, in the consumer item procurement support system according to one embodiment of the present invention, this processing flow is processed mainly by the commodity proposal server.

The processing is started in step S1301 in FIG. 13, and the processing proceeds to step S1302, in which a proposal ground, and experience information on the user (customer) based thereon are extracted. These are processed by referring to the customer-specific experienced commodity information database, according to one embodiment. More specifically, at timing when certain image registration commodity information is updated, it is verified whether the commodity has been purchased from the own company (own store) or not. If the commodity has been purchased from another company, and various pieces of information for determining whether a purchase proposal from the own company is allowed or not with respect to the remaining quantity, consumption period and the like (the relationship with the discount rate and the like is also considered here) are extracted.

Next, the processing proceeds to step S1303, in which the repeatedly purchased commodity management DB and the commodity recommendation management DB are referred to, and a preprocess for an optimal proposal for the customer is executed. The processing then proceeds to step S1304, in which a process of optimizing commodities allowed to be proposed on a customer-by-customer basis is executed. The result of this optimization process is output as a customer-specific proposed commodity table (step S1305).

In step S1306, notification about the proposed commodity is issued to the customer on the basis of the predetermined trigger (periodically/irregularly, or triggered by actions by the user). The notification example encompasses push notification, notification on an application screen or a web page, email guidance and the like.

Figure 14:
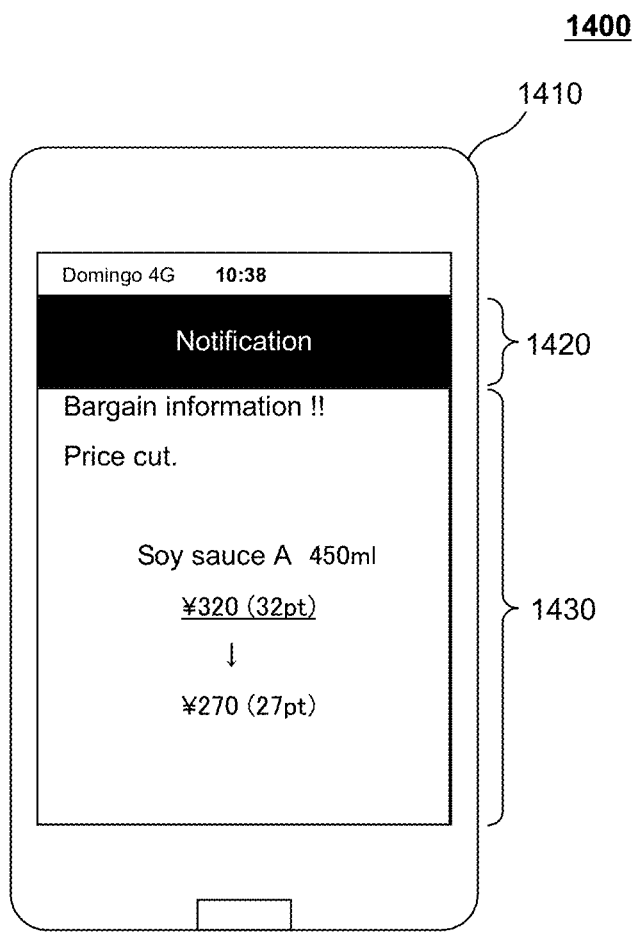
FIG. 14 illustrates a display example of the information processing apparatus (user terminal or customer terminal) in the consumer item procurement support system according to one embodiment of the present invention.

FIG. 14 shows the aforementioned notification example to the user (customer). In FIG. 14, accompanied by a message 1420 "Notification", bargain information displayed on a notification screen 1430 is displayed on the display unit on the housing 1410 of the user terminal 1400.

There is a high possibility that the thus notified user (customer) requires the commodity in the notification content ("Soy sauce A" in FIG. 14) based on determination by the consumer item procurement support system according to one embodiment of the present invention. The bargain information serves as useful information.

Lastly, the processing proceeds to step S1307, in which as for this flow, the processing is finished.

The embodiment of the consumer item procurement support system and the like has been described based on the specific examples. However, besides a method or a program for implementing a system or an apparatus, a storage medium storing a program (for example, an optical disk, a magneto-optical disk, a CD-ROM, a CD-R, a CD-RW, magnetic tape, a hard disk, and a memory card) and the like can be adopted as embodiments of the present invention.

Program implementation modes are not limited to application programs, such as object code to be compiled by a compiler, and program code to be executed by an interpreter, and may be modes, such as program modules and the like implemented in an operating system.

Furthermore, not all the processes of the program are necessarily executed only on a CPU on a control board. A configuration may be adopted where some or all of the processes are executed by another processing unit (DSP etc.) implemented on an extension board or an extension unit added to the control board, as required.

All the configuration elements described in this specification (including claims, abstract and drawings) and/or all the disclosed methods or all the steps of processes can be combined according to any combination except combinations with the features being exclusive from each other.

Each of the features described in this specification (including claims, abstract and drawings) can be replaced with an alternative feature functioning for an identical purpose, an equivalent purpose, or a similar purpose, unless explicitly negated. Consequently, unless explicitly negated, the disclosed features are only examples of a comprehensive series of the identical or equivalent features.

Furthermore, the present invention is not limited to any of the specific configurations of the embodiments described above. The present invention can be extended to all the novel features described in this specification (including claims, abstract and drawings) or a combination thereof, or all the described novel methods or steps of processes, or a combination thereof.

REFERENCE SIGNS LIST

11 Information processing server (group)
12a-12d Tablet terminal (one mode of user terminal apparatus)
13 Mobile phone (one mode of user terminal apparatus)
14-15 PC (one mode of user terminal apparatus and/or store-side terminal)
17a-17b, 18 Communication line
19 Public line (dedicated line, Internet, etc.)

The invention claimed is:

1. A consumer item procurement support system for a consumer item provider for storing unpurchased commodities, the consumer item procurement support system including at least one information processing server, that has a processor and a database and communicates with a terminal of a customer via a network, wherein the processor:
   receives an image of each of the consumer items sold by the consumer item provider via the network, extracts an image feature of the received image by an image recognition process, and stores the image and the image feature in a commodity image feature database;
   for each customer, registers and manages one or more consumer items that the customer has purchased from the consumer item provider as one or more customer-specific experienced commodities;
   receives from the terminal of the customer via the network a taken image of consumer item captured by the terminal of the customer, extracts an image feature of the received taken image of the consumer item by the image recognition process, and determines one or more commodity candidates by comparing the image feature of the consumer items stored in the commodity image feature database and the image feature of the taken image;
   sends, to a display of the terminal of the customer via the network, the determined one or more commodity candidates as a result of the comparison;
   receives from the terminal of the customer via the network, a selection of one of the one or more commodity candidates that the user has previously purchased;
   comparing the selected one of the one or more commodity candidates and the one or more customer-specific experienced commodity; and
   identifying and storing one or more unpurchased commodities that are consumer items that correspond to the selected one of the one or more commodity candidates and that are not stored in the one or more customer-specific experienced commodities.

2. The system according to claim 1, wherein the information processing server makes a commodity proposal to the customer, based on the unpurchased commodities.

3. The system according to claim 2, wherein the commodity proposal to the customer is determined based on a remaining quantity of the unpurchased commodities from the consumer item provider when the remaining quantity is recognized by the recognition process.

4. A method executed on a consumer item procurement support system for a consumer item provider for storing unpurchased commodities, the consumer item procurement support system including at least one information processing server, that has a processor and a database and communicates with a terminal of a customer via a network, said information processing server comprises a commodity image feature database of one or more consumer items provided by the consumer item provider, the method causing the processor of the information processing server to execute:
   a step of receiving an image of each of the consumer items sold by the consumer item provider via the network, extracting an image feature of the received image by an image recognition process, and storing the image and the image feature in the commodity image feature database;
   a step of registering and managing one or more consumer items that the customer has purchased from the consumer item provider as one or more customer-specific experienced commodities;
   a step of receiving from the terminal of the customer via the network a taken image of a consumer item captured by the terminal of the customer, extracts an image feature of the received taken image of the consumer item by the image recognition process, and determining one or more commodity candidates by comparing the image feature of the consumer items stored in the commodity image feature database and the image feature of the taken image; a step of sending, to a display of the terminal of the customer via the network, the determined one or more commodity candidates as a result of the comparison;
   a step of receiving from the terminal of the customer via the network, a selection of one of the one or more commodity candidates that the user has previously purchased;
   a step of comparing the selected one of the one or more commodity candidates and the one or more customer-specific experienced commodity; and
   a step of identifying and storing one or more unpurchased commodities that are consumer items that correspond to the selected one of the one or more commodity candidates and that are not stored in the one or more customer-specific experienced commodities.

5. The method according to claim 4, further comprising a step of making a commodity proposal to the customer, based on the unpurchased commodities.

6. The method according to claim 5, wherein the commodity proposal to the customer is determined based on a remaining quantity of the unpurchased commodities from the consumer item provider when the remaining quantity is recognized by the recognition process.

* * * * *